United States Patent [19]

Bianco

[11] Patent Number: 5,386,471
[45] Date of Patent: Jan. 31, 1995

[54] METHOD AND APPARATUS FOR SECURELY CONVEYING NETWORK CONTROL DATA ACROSS A CRYPTOGRAPHIC BOUNDARY

[75] Inventor: Mark E. Bianco, Pomona, Calif.

[73] Assignee: Hughes Aircraft Company, Los Angeles, Calif.

[21] Appl. No.: 186,713

[22] Filed: Jan. 25, 1994

[51] Int. Cl.$^6$ ............................................. H04L 9/00
[52] U.S. Cl. ........................................ 380/49; 380/4; 380/9; 380/50
[58] Field of Search ................... 380/4, 9, 23, 25, 29, 380/49, 50, 22; 235/379, 380

[56] References Cited

U.S. PATENT DOCUMENTS 4,941,176 . 7/1990 Matyas et al. ................... 380/25 X Primary Examiner—Bernarr E. Gregory
Attorney, Agent, or Firm—W. K. Denson-Low

[57] ABSTRACT

Disclosed is a method and apparatus for securely conveying network control data across a cryptographic boundary (12). A plain text (PT) processor (32) located on a plain text side (14) of the cryptographic boundary (12) transfers unencrypted data packets to and from plain text devices on the plain text side (14). A crypto processor (34) encrypts the unencrypted data packets from the PT processor (32). A cipher text (CT) processor (20) transfers encrypted data packets from the crypto processor (34) to network devices located on a cipher text side (16) of the cryptographic boundary (12). The CT processor (20) transfers the encrypted data packets to the appropriate destination address by reading the destination address from an isolated RAM (22) containing a mapping table (26) which is automatically constructed upon initialization by the CT processor (20). The mapping table (26) identifies the destination addresses and other network control data for active network devices on the cipher text side (16) of the cryptographic boundary (12). The PT processor (32) contains an identical copy of the mapping table (26) and determines a pointer corresponding to the location of the destination address and other network control data in the mapping table (26). The CT processor (20) utilizes this pointer to read the destination address and network control data from the mapping table (26) located in the isolated RAM (22).

23 Claims, 2 Drawing Sheets

METHOD AND APPARATUS FOR SECURELY CONVEYING NETWORK CONTROL DATA ACROSS A CRYPTOGRAPHIC BOUNDARY

BACKGROUND OF THE INVENTION

1. Field of the Invention

This invention relates generally to conveying network control data and, more particularly, to a method and apparatus for securely conveying network control data across a cryptographic boundary.

2. Discussion of the Related Art

Networked communication systems exchange messages according to specific protocols. Most of these protocols are composed of two basic fields, known generally as control fields and data fields. The control fields are used by a sending node to indicate the network address of the destination node, and to request specific network services such as message priority, throughput requirements and type of service. The data fields on the other hand contain the actual data or messages to be exchanged between the nodes.

Since physical access to many networks cannot be controlled or monitored, encryption is often used to protect the contents of the data fields from being disclosed to an unauthorized party or an eavesdropper. However, the nature of networking protocols significantly complicates the design of highly secure network encryption devices. For example, in a network with more than two nodes, control fields typically cannot be encrypted since that would render the control fields unintelligible to the network. This prevents the network from forwarding the entire message or data packet to the appropriate destination node or address. To overcome this limitation, as well as other limitations, three techniques have been used to provide cryptographic services to network security devices.

The first technique involves bypassing the network control fields around the encryption device, thereby encrypting only the data fields. However, this technique suffers from two inherent disadvantages. First, it is possible for data fields to be bypassed (i.e., either in addition to the control fields or instead of the control fields) due to hardware or software faults. If this occurs, the bypassed data fields will be transferred over the network without the benefit of encryption. Since the data processed by such systems typically contains sensitive data (i.e., financial transactions or data supporting military operations), transmitting this data unencrypted compromises the data and thus may have very serious consequences. The second disadvantage of this method is that host devices must be implicitly trusted not to place sensitive data in control fields since that would allow the sensitive data to be released and transmitted throughout the network unencrypted, even though the bypass functioned correctly and only bypassed what appeared to be control fields. Consequently, incorporating adequate levels of trust in host devices is typically a very complex and expensive effort.

The second technique avoids the disadvantages associated with bypass methods by encrypting the entire message or data packet (i.e., control fields and data fields). However, this method can only be used to protect network messages on a link-to-link basis and cannot provide end-to-end security. In addition, all messages must be decrypted at each intermediate network switch so the control fields can be interpreted and acted upon, thereby exposing the data fields at these nodes to a possible compromise. Moreover, this technique requires complex key management to ensure that each intermediate network switch has the proper cryptographic key, which also increases the possibility that the network messages could be compromised.

The third technique eliminates the above-mentioned disadvantages by utilizing a mapping scheme based on two identical tables contained on a host processing side and a network processing side of the cryptographic boundary. By utilizing this approach, each network address or destination is associated with a unique pointer into the table. The host side thus indicates to the network side which table entry to use with this pointer. While this pointer still needs to be bypassed, the pointer does not contain any sensitive data. However, the disadvantage of this technique is that the tables must be manually created and updated, and is therefore too time consuming and inefficient when network configurations change rapidly. Additionally, this technique requires the network security devices to be off-line for a period of time in order to individually load and initialize the new tables into all network security devices used throughout the network, thereby causing interruptions in network services.

Each of the above-mentioned encryption techniques will prohibit unauthorized access to the data fields as they pass between various networks. However, each of these techniques have several drawbacks and limitations associated with their use. These drawbacks and limitations include complex and expensive network security device implementations, possibilities of transferring unencrypted data fields due to hardware or software faults, exposure of unencrypted data fields at each network switch, inefficient manual updating of mapping tables, and interruptions in network services due to the loading and initializing of new tables.

What is needed then is a method and apparatus for securely conveying network control data across a cryptographic boundary that does not suffer from the above-mentioned drawbacks and limitations. This will, in turn, reduce the cost and complexity of the network security device, eliminate the possibility of data compromises due to hardware or software faults, and allow the network security device to adaptively react to rapidly changing network configurations in a highly secure and responsive manner. It is, therefore, an object of the present invention to provide such a device.

SUMMARY OF THE INVENTION

In accordance with the teachings of the present invention, a method and apparatus for securely conveying network control data across a cryptographic boundary of a network security device is disclosed. This is basically achieved by automatically constructing a mapping table with a cipher text (CT) processor to identify the addresses of active network devices on a cipher text side of the cryptographic boundary. Once the mapping table is constructed, an identical copy of the mapping table is transferred to a plain text side of the cryptographic boundary. Thereafter, when a data packet is encrypted on the plain text side of the cryptographic boundary and transferred to the cipher text side, the CT processor can determine the destination address of the encrypted data packet. The CT processor determines this destination address by utilizing a pointer from the plain text side which identifies the location of the destination address in the mapping table.

In one preferred embodiment, a plain text (PT) processor card having a plain text (PT) processor and a plain text (PT) processor memory is provided. The PT processor transfers unencrypted data packets to and from plain text devices on a plain text side of a cryptographic boundary. The PT processor memory stores a copy of a mapping table identifying active network devices on a cipher text side of the cryptographic boundary. This allows the PT processor to locate the destination addresses of the data packets in the mapping table. The PT processor then transfers corresponding pointers to the cipher text side which identifies the locations of the destination addresses in the mapping table.

A crypto processor card is provided which includes a crypto processor, a unidirectional bypass and a pointer register. The crypto processor encrypts the unencrypted data packets from the PT processor, while the pointer register latches the pointer from the PT processor. The unidirectional bypass allows the copy of the mapping table which originated on the cipher text side to be bypassed from the cipher text side to the plain text side of the cryptographic boundary.

A cipher text (CT) processor card is also provided which includes a cipher text (CT) processor, an isolated memory and a multiplexer. The CT processor transfers the encrypted data packets from the crypto processor to network devices on the cipher text side of the cryptographic boundary. The isolated memory stores the mapping table which is automatically constructed by the CT processor to identify the addresses of active network devices. 1 The multiplexer provides the CT processor access to the upper order addresses of the isolated memory so that the mapping table can be transferred from the CT processor into the isolated memory. Thus, when the pointer from the pointer register points to the appropriate network addresses in the mapping table located in the isolated memory, the CT processor can read the addresses and transfer the encrypted data packets to the appropriate network devices.

Use of the present invention provides a method and apparatus for securely conveying network control data across a cryptographic boundary. As a result, the aforementioned disadvantages associated with the current approaches of transferring unencrypted network control data have been substantially eliminated.

BRIEF DESCRIPTION OF THE DRAWINGS

Still other advantages of the present invention will become apparent to those skilled in the art after reading the following specification and by reference to the following drawings in which.

DETAILED DESCRIPTION OF THE PREFERRED EMBODIMENT

The following description of a method and apparatus for securely conveying network control data across a cryptographic boundary is merely exemplary in nature and is in no way intended to limit the invention or its application or uses.

Figure 1:
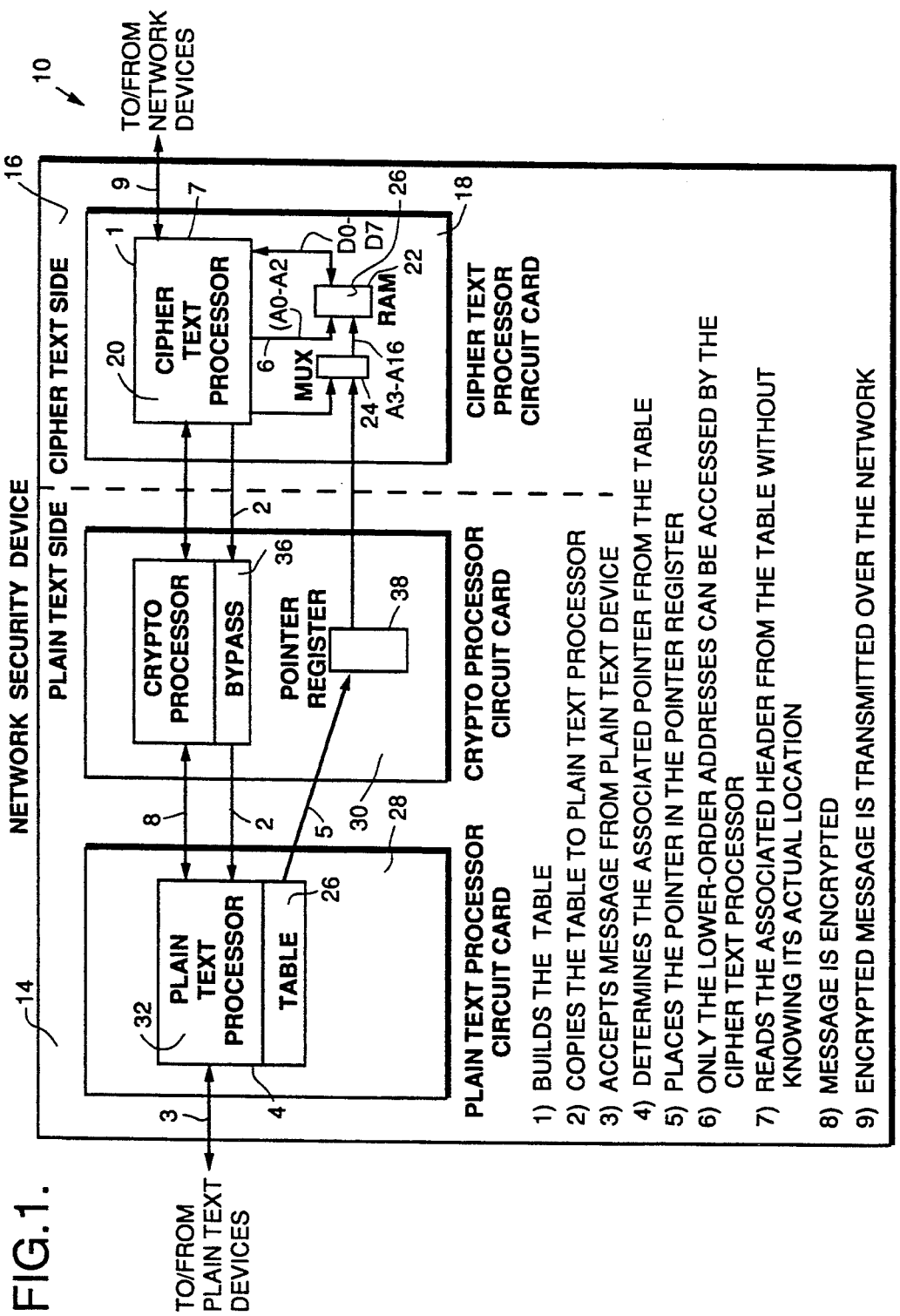
FIG. 1 is a schematic block diagram of one preferred embodiment of the present invention.

Referring to FIG. 1, a schematic block diagram of one preferred embodiment of a network security device 10 for securely conveying network control data across a cryptographic boundary 12 is shown. The network security device 10 maintains the cryptographic boundary 12 which separates a plain text side 14 from a cipher text side 16. The network security device 10 includes a cipher text (CT) processor circuit card 18 located on the cipher text side 16 of the cryptographic boundary 12.

Figure 2:
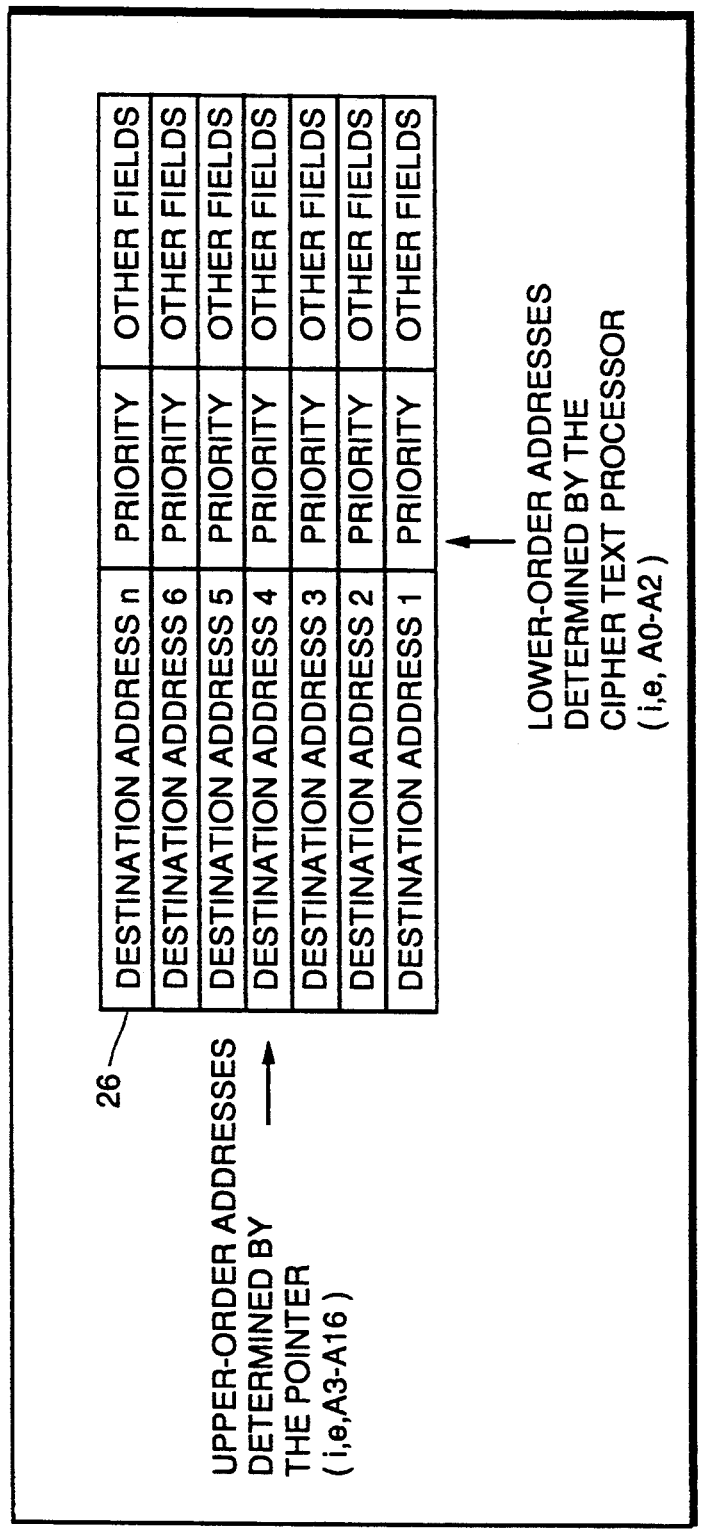
FIG. 2 is a block diagram of a table created and utilized by the preferred embodiment.

The CT processor card 18 includes a cipher text (CT) processor 20, random access memory (RAM) 22 and a multiplexer 24. The CT processor 20 is preferably a Motorola 68000-family microprocessor, although other microprocessors could also be utilized depending on the performance requirements of the network and power requirements of the network security device 10. The CT processor 20 is utilized to transfer messages or data packets to and from various network devices (not shown), located on the cipher text side 16 of the cryptographic boundary 12. Examples of network devices include other network security devices, switches, routers and gateways. The CT processor 20 is also utilized to construct a mapping table 26 upon initialization for identifying the active network devices on the cipher text side 16 of the cryptographic boundary 12. Once this mapping table 26, shown clearly in FIG. 2, is constructed, the CT processor 20 transfers this mapping table to the separate isolated RAM 22. The RAM 22 is preferably a standard 1 M byte RAM device organized as 128 K addresses of 8 bits each, which supports up to 16,384 network addresses when 64 bit table entries are used. It should be noted that the lower order address lines A0–A2 of the RAM 22 are accessed directly by the CT processor 20 while the upper order address lines A3–A16 are accessed through the multiplexer 24.

The plain text side 14 of the network security device 10 includes a plain text (PT) processor circuit card 28 and a crypto processor circuit card 30. The PT processor card 28 includes a plain text (PT) processor 32 which is also preferably a Motorola 68000-family microprocessor. The PT processor 32 is utilized to transfer messages or data packets to and from various plain text devices (not shown) on the plain text side 14 of the cryptographic boundary 12. Examples of plain text devices include hosts (i.e., computers) and other networks (i.e., local area networks within physically controlled environments) that process sensitive data. The PT processor 32 also includes a copy of the mapping table 26 which is stored in the internal PT processor memory (not shown).

The crypto processor card 30 includes a crypto processor 34 which is preferably an encryption integrated circuit (IC) such as the widely-known Data Encryption Standard (DES) as defined in the Federal Information Processing Standards Publication No. 46-1 published by the U.S. Department of Commerce and the National Institute of Standards and Technology. The crypto processor 34 encrypts messages received from the plain text side 14 and decrypts messages received from the cipher text side 16. A unidirectional bypass 36 allows the CT processor 20 to pass the copy of the mapping table 26 on the cipher text side 16 to the PT processor 32 on the plain text side 14 without encrypting the mapping table 26. The unidirectional bypass 36 is preferably constructed from a multiplexer. The crypto processor card 30 also includes a separate pointer register 38 which is utilized to point to the upper order address lines A3–A16 of the RAM 22 through the multiplexer 24. The pointer register 38 is preferably a 14-bit register which can be constructed conventionally from 14 flip-flops or a shift register (not shown).

In operation, the CT processor 20 in the CT processor card 18 automatically constructs the mapping table 26 which identifies all of the currently active devices on the cipher text side 16. This mapping table 26 is automatically constructed during the initialization of the network security device 10 preferably by transmitting messages out from the CT processor 20 to locate active devices, also known in the art as "pinging" for active devices. It should also be noted that the mapping table 26 can be constructed by monitoring the address fields of messages being exchanged via the network. As the currently active devices are identified, the CT processor 20 stores the network address of each of these active devices in its own internal processing memory (not shown) to construct the mapping table 26. Additionally, the CT processor 20 adaptively updates the table in real time by adding new network devices as they enter the network and also by removing network devices after they have been idle for a specific period of time.

After the CT processor 20 identifies the then current active devices, the CT processor 20 transfers the mapping table 26 into the separate isolated RAM 22. The CT processor 20 transfers the mapping table to the separate isolated RAM 22 by directly accessing addresses A0–A2 and accessing addresses A3–A16 through the multiplexer 24 as the network addresses of the active devices are transferred through the data lines D0–D7. Additionally, message priority, throughput requirements and type of service for each device may also be stored in the mapping table 26, as shown clearly in FIG. 2. The CT processor 20 also transfers an identical copy of the mapping table 26 to the PT processor 32 through the unidirectional bypass 36. The PT processor 32 then stores the mapping table 26 in its own internal processor memory.

After the copy of the mapping table 26 is transferred into the memory of the PT processor 32, the PT processor 32 accepts messages from various plain text devices on the plain text side 14 of the cryptographic boundary 12. When the PT processor 32 receives a message or data packet from a plain text device, the PT processor 32 reads the destination address in the control field, as well as other control data such as priority, throughput and type of service. The PT processor 32 then looks up this control data in the mapping table 26 to determine the pointer associated with the control data or corresponding destination address. Thereafter, the PT processor 32 forwards this associated pointer to the pointer register 38 in the crypto processor card 30. Since the CT processor 20 only accesses address A3–A16 of the RAM 22 during transfer of the mapping table 26 into the RAM 22, the multiplexer 24 is set at all other times to receive the output from the pointer register 38. The output of the pointer register 38 therefore passes through the multiplexer 24 to point to the upper order addresses of the RAM 22, shown clearly in FIG. 2.

The CT processor 20 then accesses the lower order addresses A0–A2 of the RAM 22 in order to read the network address, priority and other control information at the location where the pointer is pointing without knowing the pointer's actual location. The CT processor 20 does not have access to the pointer itself. After the PT processor 32 passes the pointer to the pointer register 38, the PT processor 32 transfers the entire message or data packet received from the plain text device, which includes the control field and the data field, to the crypto processor 34. The crypto processor 34 then encrypts the entire message. Thereafter, the crypto processor 34 transfers the completely encrypted message to the CT processor 20. Since the CT processor 20 cannot read the encrypted control field, it must determine the network address of the destination from the mapping table 26 in the RAM 22 which is pointed to by the pointer register 38. Upon reading the network address from the mapping table 26, as well as the other control data, the CT processor 20 then transmits the entire encrypted message out the cipher text side 16 of the cryptographic boundary 12 to the appropriate network device identified by the destination address. Additionally, the CT processor 20 also appends the unencrypted control field gathered from the mapping table 26 to the entire encrypted message or data packet. This allows the devices on the cipher text side to read the unencrypted control field to determine if it should accept the message (i.e., if it contains the appropriate destination address).

When the CT processor 20 accepts an encrypted message from a network device on the cipher text side 16 of the cryptographic boundary 12 by reading the unencrypted appended control field, the CT processor 20 strips off this extra control field and transfers the received encrypted message to the crypto processor 34. The crypto processor 34 decrypts the entire message and transfers this message to the PT processor 32. Once the entire message is decrypted, the control field containing the destination address is intelligible or readable by the PT processor 32 which then transfers this message to the appropriate plain text device on the plain text side 14 of the cryptographic boundary 12. Additionally, if the CT processor 20 receives a message on the cipher text side 16 which is not encrypted (i.e., the message does not contain sensitive data), the CT processor 20 can transfer this non-encrypted message through the unidirectional bypass 36 of the crypto processor card 30 to the PT processor 32. The PT processor 32 then reads the network address and transfers the message to the appropriate plain text device on the plain text side 14. The CT processor 20 can differentiate whether or not a message it receives is encrypted or not by checking to see if a particular flag is set in the control field or by checking parity bits in the data field.

Thus, when the network security device 10 operates as set forth above, network control data can be passed across the cryptographic boundary 12 in a very secure manner. This is because even under various fault conditions, the network security device 10 cannot pass an unencrypted data field from the plain text side 14 to the cipher text side 16 of the cryptographic boundary 12. For example, the bypass 36 is unidirectional, thus only allowing the CT processor 20 to bypass information from the cipher text side 16 to the plain text side 14. Consequently, since the sensitive data exists only on the plain text side 14, if the CT processor 20 on the cipher text side 16 accidentally bypasses nonsensitive (i.e., encrypted) data to the PT processor 32 through bypass 36, this does not result in a compromise of the message's confidentiality or integrity. Moreover, that is why the mapping table 26 can be maintained in the internal PT processor memory without the need for a separate isolated. RAM 22, since the PT processor 32 already has access to the sensitive data on the plain text side 14. Additionally, the only path of unencrypted data from the plain text side 14 to the cipher text side 16 is through the pointer register 38. Thus, since the CT processor 20 cannot read the pointer itself, there is no chance of the CT processor 20 reading unencrypted data fields from the plain text side 14 even if the PT processor 32 accidently places data into the pointer.

The forgoing discussion discloses and describes merely exemplary embodiments of the present invention. One skilled in the art would readily realize from such discussion, and from the accompanying drawings and claims, that various changes, modifications and variations can be made therein without departing from the spirit and scope of the invention as defined by the following claims.

What is claimed is:

1. A network security device for securely conveying network control data across a cryptographic boundary which separates a plain text side from a cipher text side, said network security device comprising:

plain text processor means for transferring a plurality of unencrypted data packets to and from a plurality of plain text devices on the plain text side of the cryptographic boundary, said plain text processor means including plain text processor memory means for storing a copy of a mapping table identifying a plurality of active network devices on the cipher text side of the cryptographic boundary, said plain text processor means locates a destination address for each unencrypted data packet in the mapping table and transfers a corresponding pointer for each unencrypted data packet which identifies the location of the destination address in the mapping table;

cryptoprocessor means for encrypting the plurality of unencrypted data packets from the plain text processor means, said cryptoprocessor means including a unidirectional bypass means for bypassing the copy of the mapping table from the cipher text side to the plain text side of the cryptographic boundary; and cipher text processor means for transferring a plurality of encrypted data packets from the cryptoprocessor means to the plurality of network devices on the cipher text side of the cryptographic boundary, said cipher text processor means including an isolated memory means for storing the mapping table, said cipher text processor means automatically constructs the mapping table identifying the active network devices and transfers the copy of the mapping table through the unidirectional bypass means to the plain text processor memory means, wherein said cipher text processor means transfers each encrypted data packet to its corresponding destination address by reading the destination address for each encrypted data packet in the mapping table where the pointer from the plain text side is pointing.

2. The network security device as defined in claim 1 wherein the plain text processor means is a plain text PT processor circuit card, said plain text processor circuit card including a plain text processor and the plain text processor memory means, said plain text processor transfers the plurality of unencrypted data packets to and from the plurality of plain text devices on the plain text side of the cryptographic boundary and said plain text processor memory means is a plain text processor memory for storing the copy of the mapping table.

3. The network security device as defined in claim 2 wherein the plain text processor is a Motorola 68000-family microprocessor.

4. The network security device as defined in claim 1 wherein the cryptoprocessor means is a cryptoprocessor circuit card, said cryptoprocessor circuit card including a cryptoprocessor and the unidirectional bypass means, said cryptoprocessor encrypts the plurality of unencrypted data packets from the plain text processor means and decrypts the plurality of encrypted data packets from the cipher text processor means.

5. The network security device as defined in claim 4 wherein the unidirectional bypass means for bypassing the copy of the mapping table is a multiplexer.

6. The network security device as defined in claim 5 wherein the cryptoprocessor circuit card further includes a pointer register for latching the pointer from the plain text processor means and for transferring the pointer to the cipher text processor means.

7. The network security device as defined in claim 1 wherein the cryptoprocessor means encrypts the plurality of unencrypted data packets utilizing the Data Encryption Standard (DES).

8. The network security device as defined in claim 1 wherein the cipher text processor means automatically constructs the mapping table identifying the active network devices on the cipher text side of the cryptographic boundary by transmitting messages out from the cipher text processor means to identify the active network devices.

9. The network security device as defined in claim 1 wherein the cipher text processor means automatically constructs the mapping table identifying the active network devices on the cipher text side of the cryptographic boundary by monitoring address fields of messages being exchanged on the cipher text side of the cryptographic boundary, wherein the cipher text processor means logs the addresses of the active network devices for use in the mapping table.

10. The network security device as defined in claim 1 wherein the cipher text processor means automatically maintains a current mapping table of active network devices on the cipher text side of the cryptographic boundary by adding new active network devices to the mapping table as they enter the network and by removing network devices that have been idle for a specific period of time.

11. The network security device as defined in claim 1 wherein the cipher text processor means is a cipher text processor circuit card, said cipher text processor circuit card including a cipher text processor and a cipher text processor memory, said cipher text processor transfers the plurality of encrypted data packets to the plurality of network devices on the cipher text side of the cryptographic boundary, and said cipher text processor memory temporarily stores the mapping table as the cipher text processor automatically constructs the mapping table.

12. The network security device as defined in claim 11 wherein the isolated memory means for storing the mapping table is a separate random access memory, wherein said cipher text processor is operable to directly access lower order addresses of the random access memory.

13. The network security device as defined in claim 12 wherein the cipher text processor circuit card includes a multiplexer for providing the cipher text processor with access to upper order addresses of the random access memory during transfer of the mapping table from the cipher text processor memory to the random access memory.

14. The network security device as defined in claim 13 wherein the multiplexer inhibits the cipher text processor from accessing the pointer when the pointer from the plain text side is addressing the random access memory.

15. The network security device as defined in claim 11 wherein the cipher text processor is a Motorola 68000-family microprocessor.

16. A network security device for securely conveying network control data across a cryptographic boundary which separates a plain text side from a cipher text side, said network security device comprising:

a plain text processor circuit card, said plain text processor circuit card including a plain text processor and a plain text processor memory, said plain text processor transfers a plurality of unencrypted data packets to and from a plurality of plain text devices on the plain text side of the cryptographic boundary, said plain text processor memory stores a copy of a mapping table identifying a plurality of active network devices on the cipher text side of the cryptographic boundary, wherein said plain text processor locates a destination address for each unencrypted data packet in the mapping table and transfers a corresponding pointer for each unencrypted data packet which identifies the location of the destination address in the mapping table;

a cryptoprocessor circuit card, said cryptoprocessor circuit card including a cryptoprocessor, a unidirectional bypass and a pointer register, said cryptoprocessor encrypts the plurality of unencrypted data packets from the plain text processor, said unidirectional bypass bypasses the copy of the mapping table from the cipher text side to the plain text side of the cryptographic boundary, said pointer register latches the pointer from the plain text processor; and a cipher text processor circuit card, said cipher text processor circuit card including a cipher text processor, a cipher text processor memory, an isolated memory, and a multiplexer, said cipher text processor transfers a plurality of encrypted data packets from the Cryptoprocessor to the plurality of network devices on the cipher text side of the cryptographic boundary, said cipher text processor memory temporarily stores the mapping table as the cipher text processor automatically constructs the mapping table identifying the active network devices, said isolated memory stores the mapping table after the cipher text processor transfers the mapping table from the cipher text processor memory to the isolated memory and the copy of the mapping table to the plain text processor memory through the unidirectional bypass, said multiplexer provides the cipher text processor with access to upper order addresses of the isolated memory during transfer of the mapping table from the cipher text processor memory to the isolated memory, wherein said cipher text processor transfers each encrypted data packet to its corresponding destination address by reading the destination address for each encrypted data packet from the mapping table where the pointer from the pointer register is pointing.

17. The network security device as defined in claim 16 wherein the cipher text processor automatically constructs the mapping table identifying the active network devices on the cipher text side of the cryptographic boundary by transmitting messages out from the cipher text processor to identify the active network devices.

18. The network security device as defined in claim 16 wherein the cipher text processor automatically constructs the mapping table identifying the active network devices on the cipher text side of the cryptographic boundary by monitoring the address fields of messages being exchanged on the cipher text side of the cryptographic boundary, wherein the cipher text processor logs the addresses of the active network devices for use in the mapping table.

19. The network security device as defined in claim 16 wherein the cipher text processor automatically maintains a current mapping table of active network devices on the cipher text side of the cryptographic boundary by adding new active network devices to the mapping table as they enter the network and by removing network devices that have been idle for a specific period of time.

20. A method for securely conveying network control data across a cryptographic boundary which separates a plain text side from a cipher text side, said method comprising the steps of:

providing a plain text processor for transferring a plurality of unencrypted data packets to and from a plurality of plain text devices on the plain text side of the cryptographic boundary;

providing a cryptoprocessor for encrypting the plurality of unencrypted data packets from the plain text processor;

providing a cipher text processor for transferring a plurality of encrypted data packets from the cryptoprocessor to a plurality of network devices on the cipher text side of the cryptographic boundary;

automatically constructing a mapping table with the cipher text processor to identify active network devices on the cipher text side of the cryptographic boundary;

storing the mapping table in an isolated memory on the cipher text side of the cryptographic boundary;

copying the mapping table to the plain text processor through a unidirectional bypass;

accepting an unencrypted data packet from a plain text device with the plain text processor;

locating a destination address for the unencrypted data packet in the copy of the mapping table contained in the plain text processor;

determining a corresponding pointer identifying the location of the destination address in the mapping table;

pointing to the corresponding destination address in the mapping table stored in the isolated memory on the cipher text side of the cryptographic boundary with the pointer;

reading the destination address where the pointer is pointing with the cipher text processor;

encrypting the unencrypted data packet with the cryptoprocessor; and transferring the encrypted data packet with the cipher text processor to its corresponding destination address where the pointer from the plain text side is pointing.

21. The method as defined in claim 20 wherein the step of pointing to the corresponding destination address in the mapping table stored in the isolated memory further includes the steps of:

latching the pointer in a pointer register; and pointing to the corresponding destination address in the mapping table stored in the isolated memory utilizing the pointer register.

22. The method as defined in claim 20 wherein the step of automatically constructing the mapping table with the cipher text processor further includes the steps of:

transmitting messages out from the cipher text processor to identify the active network devices on the cipher text side of the cryptographic boundary; and adaptively maintaining a current mapping table of active network devices on the cipher text side of the cryptographic boundary by adding new active network devices to the mapping table as they enter the network and by removing network devices that have been idle for a specific period of time.

23. The method as defined in claim 20 wherein the step of storing the mapping table in the isolated memory further includes the steps of:

directly accessing the lower order addresses of the isolated memory with the cipher text processor;

and accessing the upper order addresses of the isolated memory with the cipher text processor through a multiplexer.

* * * * *